(12) United States Patent
Tian et al.

(10) Patent No.: US 11,648,604 B2
(45) Date of Patent: May 16, 2023

(54) ROBOT VISION-BASED AUTOMATIC RIVET PLACEMENT SYSTEM AND METHOD

(71) Applicant: NANJING UNIVERSITY OF AERONAUTICS AND ASTRONAUTICS, Nanjing (CN)

(72) Inventors: Wei Tian, Nanjing (CN); Yi Zheng, Nanjing (CN); Zhiwei Zhuang, Nanjing (CN); Wenhe Liao, Nanjing (CN); Lin Zhang, Nanjing (CN); Bo Li, Nanjing (CN); Junshan Hu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/289,020

(22) PCT Filed: Oct. 8, 2019

(86) PCT No.: PCT/CN2019/109866
§ 371 (c)(1),
(2) Date: Apr. 27, 2021

(87) PCT Pub. No.: WO2021/003858
PCT Pub. Date: Jan. 14, 2021

(65) Prior Publication Data
US 2021/0346939 A1    Nov. 11, 2021

(30) Foreign Application Priority Data
Jul. 10, 2019  (CN) .......................... 201910620737.6

(51) Int. Cl.
*B21J 15/32*      (2006.01)
*B21J 15/26*      (2006.01)
(Continued)

(52) U.S. Cl.
CPC ............... *B21J 15/32* (2013.01); *B21J 15/26* (2013.01); *B23P 19/001* (2013.01);
(Continued)

(58) Field of Classification Search
CPC ........ B25J 15/0616–0666; B25J 19/022; B25J 9/1697; B25J 19/023; B25J 9/0096;
(Continued)

(56) References Cited

U.S. PATENT DOCUMENTS 5,727,300  A  *  3/1998  Ekdahl ..................... B21J 15/32
                                                    29/407.04
2004/0148748  A1*  8/2004  Woyciesjes ............ B21J 15/105
                                                    29/243.521
(Continued)

FOREIGN PATENT DOCUMENTS

CN            109290506 B  *  7/2019  ............ B21J 15/142

OTHER PUBLICATIONS

Li, Feiyu et al. "A Robot Rivet Feeding System for Automatic Drilling and Riveting" Aeronautical Manufacturing Technology, vol. 62, No. 10, May 15, 2019 (May 15, 2019), pp. 44-50* (Year: 2019).*
(Continued)

*Primary Examiner* — Matthew P Travers
(74) *Attorney, Agent, or Firm* — PROI Intellectual Property US; Klaus Michael Schmid (57) ABSTRACT

A robot vision-based automatic rivet placement system and method. The automatic rivet placement system includes: an industrial robot installed on a frame, a multi-functional end effector, a rivet blowing mechanism, a detection disk, and a rivet holding tray. The multi-functional end effector consists of a flange disk, a support frame, an industrial CCD camera, a laser displacement sensor, a spring, a mixing rod, and a vacuum nozzle. The multi-functional end effector is con-
(Continued)

nected to a terminal end of the industrial robot via the flange disk. The industrial CCD camera is installed directly in front of the support frame, and is used to acquire a rivet image and measure a rivet parameter. The laser displacement sensor is installed at a side surface of the support frame, and is used to measure a rivet depth.

10 Claims, 5 Drawing Sheets

(51) Int. Cl.
   *B25J 11/00* (2006.01)
   *B23P 19/00* (2006.01)
   *B25J 9/16* (2006.01)
   *B25J 19/02* (2006.01)
   *B25J 15/06* (2006.01)

(52) U.S. Cl.
   CPC ........... *B23P 19/007* (2013.01); *B25J 9/1697* (2013.01); *B25J 11/007* (2013.01); *B23P 19/005* (2013.01); *B25J 15/0616* (2013.01); *B25J 19/022* (2013.01); *B25J 19/023* (2013.01)

(58) Field of Classification Search
   CPC ........ B25J 11/005; B21J 11/007; B21J 15/10; B21J 15/142; B21J 15/26; B21J 15/28; B21J 15/30–32; B23P 19/001; B23P 19/004–005; B23P 19/007
   See application file for complete search history.

(56) References Cited

U.S. PATENT DOCUMENTS

| | | | |
|---|---|---|---|
| 2013/0085605 A1* | 4/2013 | Yasuda | B25J 9/1697 901/46 |
| 2019/0291171 A1* | 9/2019 | Eusterwiemann | B23P 19/001 |
| 2020/0108438 A1* | 4/2020 | Eusterwiemann | B25J 11/00 |
| 2020/0282449 A1* | 9/2020 | Eusterwiemann | B23P 19/004 |
| 2021/0291256 A1* | 9/2021 | Zhao | B21J 15/28 |

OTHER PUBLICATIONS

Translation of Li, Feiyu et al. (Year: 2019).*

* cited by examiner

NANJING UNIVERSITY OF
AERONAUTICS AND ASTRONAUTICS

FIG. 1

NANJING UNIVERSITY OF
AERONAUTICS AND ASTRONAUTICS

ROBOT VISION-BASED AUTOMATIC RIVET PLACEMENT SYSTEM AND METHOD

TECHNICAL FIELD

The present invention relates to an aeronautical manufacturing direction in the field of intelligent manufacturing, and particularly relates to a robot vision-based automatic rivet placement system and method.

BACKGROUND ART

With the development of large passenger aircrafts and new fighters in China, aircraft manufacturing has higher requirements for high quality, high efficiency, long life, and the like (Zeng Yuanfan. Research on an industrial-robot positioning accuracy compensation technology based on spatial similarity [D]. Nanjing: Nanjing University of Aeronautics and Astronautics, 2017.), and aircraft assembling accounts for 40%-50% of the overall manufacturing cycle where riveting accounts for 30% (Fei Jun. Development current situation and application analysis of an automatic drilling and riveting technology [J]. Aviation Manufacturing Technology, 2005, (6): 42-44.). Related statistics show that 70% of aircraft fatigue failure accidents are caused by their connecting parts, and 80% of fatigue cracks are generated at connecting holes (Xu Guokang. Automatic assembling technology for large aircraft [J]. Journal of Aeronautics and Astronautics, 2008, 29(3): 13-13.). It can be seen that high-efficiency and high-quality riveting is of great significance to improving the quality and efficiency of aircraft assembling.

An automatic drilling and riveting system refers to intelligent equipment that can automatically complete positioning, clamping, drilling/countersinking, gluing, rivet placement, riveting/installation and other work processes of assembling parts in an assembling process (Xu Guokang. Automatic assembling technology for large aircraft [J]. Journal of Aeronautics and Astronautics, 2008, 29(3): 13-13.). Foreign countries began to use an automatic drilling and riveting technology for aircraft assembling as early as 1950s. So far, many companies have mastered a more mature automatic drilling and riveting technology, and it has been proved that automatic drilling and riveting can improve the assembling efficiency by 10 times or more compared with manual drilling and riveting (Lou Ali. Development current situation and application of the automatic drilling and riveting technology at home and abroad [J]. Aeronautical Manufacturing Technology, 2005, (6): 50-52.). Therefore, the automatic drilling and riveting technology has become an inevitable trend in today's aviation manufacturing industry.

In the automatic drilling and riveting operations for aircrafts, since an aircraft requires a variety of types of rivets in a large quantity, an automatic rivet placement system is of great importance to the automatic drilling and riveting system. A reliable automatic rivet placement system can significantly improve the performance of the automatic drilling and riveting system (Tian W, Zhou Z, Liao W. Analysis and investigation of a rivet feeding tube in an aircraft automatic drilling and riveting system [J]. International Journal of Advanced Manufacturing Technology, 2016, 82(5-8): 973-983.). A traditional automatic rivet placement system should generally have core functions such as directional rivet arrangement, rivet storage, rivet sorting, rivet conveying, and rivet detection. The directional rivet arrangement means that rivets are arranged in a fixed posture and stored in a storage container. Rivet sorting is a process of taking out the rivets of corresponding model specifications from the storage container according to a requirement of a drilling and riveting end effector. The rivet conveying is a process of conveying the selected rivets from a tray to the drilling and riveting end effector. The rivet detection is to perform final detection, such as diameter detection, length detection and defect detection, on the rivets conveyed to the end effector to ensure that the rivets for final riveting are qualified products.

Since an aircraft requires a variety of types of rivets, usually 30 to 50 types, it is a key technical problem to accurately take out rivets of different specifications from a tray or directionally arrange the rivets of different specifications. In the current solution, a vibrating plate is mostly used to arrange and sort rivets. A traditional way of rivet placement by the vibrating plate has defects of large volume, high noise, severe vibration, etc., which seriously affect the hole making accuracy of drilling and riveting equipment and can no longer meet the use requirements. At present, relevant units engaged in this area have also designed some new automatic rivet placement systems to convey various types of rivets for the automatic drilling and riveting equipment. Zhejiang University proposes a drawer type automatic rivet placement device, which is characterized in that a hose for storing rivets is placed in a drawer. The rivets in the hose are arranged directionally. If necessary, high-pressure air can be used to blow the rivets out of the hose and into a rivet placement pipe conveyed to a rivet extractor (Jiang Junxia, Ke Yinglin, Huang Qiwei, et al. Automatic headed rivet supply system for automatic drilling and riveting machine for aircraft wall panel [P]. 2017.). The device uses two sets of pins controlled by an air cylinder to achieve single output of the rivets, and can perform a certain error correction function at the same time. However, no filling mode is provided for the rivets directionally arranged in the drawer. Nanjing University of Aeronautics and Astronautics has constructed a set of rivet sorting and placement system that realizes filling through a vibrating plate and supports nearly a hundred specifications of rivets. This system includes a fixed material station and a mobile material station, which can realize parallel execution of drilling and riveting processes and screening and filling of the rivets. In addition, a triple error-proof mechanism which includes an output end of the vibrating plate, a filling process from the fixed material station to the mobile material station and detection of diameters of the rivets by an industrial camera at a drilling and riveting end is added, and the triple error-proof mechanism can guarantee the accuracy of the rivets to a large extent (Zhou Zhenfeng, Tian Wei, Liao Wenhe. Research on automatic rivet placement system for assembling production line of aircraft parts [J]. Aviation Precision Manufacturing Technology, 2014, (1): 34-37.). However, most of errors in the above-mentioned system require manual investigation, which affects the production efficiency, so that the system still needs to be improved. An automatic drilling and riveting system of Italy BC company is equipped with an automatic screening system that can automatically identify and efficiently convey more than 100 types of rivets. The system is also equipped with dedicated management software for unified management for rivets of different specifications (Liu Yuping, Yang Hongyi. Building a pioneer of automatic drilling and riveting equipment in the aviation industry [J]. Aviation Manufacturing Technology, 2006, (12): 60-61.). Automatic drilling and riveting machines G400 and G900 of American General Corporation are equipped with a feeding system that can provide four kinds of rivets at the same time.

In the system, rivets in an inverted trapezoidal hopper are screened to a specifically shaped groove through a plugboard that moves up and down, then enter a rigid rail from an outlet of a stock bin, and are conveyed to a rivet feeder at the other end to realize automatic feeding (Li Han. Design and research of automatic drilling and riveting terminal based on dual-robot collaboration and automatic rivet placement device thereof [D]. Zhejiang University, 2010.). French AHG Fastener Company and Dassault Aircraft Company jointly develop a novel automatic drilling and riveting machine rivet supply system. In the system, a sorter is added in a rivet hopper to sort out unqualified rivets to ensure that the unqualified rivets will not enter a rivet placement pipeline. In addition, this system has a plurality of rivet hoppers, which can respectively hold rivets with different diameters and lengths for selection during use (Aeronautical Manufacturing Engineering Writing Group. Novel rivet supply system of automatic drilling and riveting machine [J]. Aeronautical Manufacturing Engineering, 1996, (3).). However, the system has a larger volume and there is a limited number of rivet hoppers that can be accommodated in a limited space. For an automatic aircraft drilling and riveting operation that needs to convey dozens of rivets in a technological process, this system cannot meet the requirement.

In addition, with the increasingly maturation of the robot vision technology, some people have also applied the robot vision technology to a rivet pick-up and detection process of the automatic rivet placement system in recent years. In the Chinese invention with the publication patent number CN109290506A, and entitled "Robot-based Automatic Rivet Placement System and Working Method thereof", a binocular vision pick-up terminal end is used to identify and pick up various types of rivets, but the binocular vision can only identify rivets in a single-layer sparse distribution state. Therefore, in this solution, the rivets need to be laid out in a one-layer sparse distribution state, which cannot adapt to a situation where rivets are crossed and stacked layer by layer, and the identification rate of rivets is low. Especially when a plurality of rivets are crossed or touch at the edges, parameters, such as the diameter and the length, of the rivets cannot be measured. Moreover, an air claw is used to pick up the rivets, leading to the disadvantages that pick-up is unreliable, excessive rivets are easy to pick up, and there are rivets which are not picked up. In addition, in actual application of this invention, the rivets in a holding rack need to be conveyed to a pick-up station before visual inspection and pick-up are performed, so that the overall working efficiency is low.

In the industrial-robot-based automatic drilling and riveting system, since the drilling and riveting end effector will move with a mechanical arm in a space, the rivets can only be blown to the drilling and riveting end effector through a thin pipeline. However, the thin pipeline is wound on the mechanical arm of the industrial robot, with many corners, and the rivets are prone to lock. The statistical research of AHG shows that 90% of failures in the automatic drilling and riveting system are caused by the rivet supply system (Gong Hui, Zhu Borong, Fang Qiang. Experimental study on the automatic rivet supply system for robot automatic drilling and riveting [J]. Mechanical & Electrical Engineering, 2012, 29(4): 404-408.). The rivets come out of the storage hopper and enter the rivet placement pipeline in a disorderly manner, which may be deadly locked to cause the system to shut down. Gong Hui, et al. [12] propose a rivet supply system that uses a suction cup to transfer rivets and uses an air pipe to blow rivets. A rivet supply device of this system uses a suction cup type rivet placement module. A suction cup is used to suck rivets from a rivet supply pipeline and convey them to a rivet blowing pipeline. However, in this way, when the suction cup sucks the rivets and conveys them, the rivets are easy to fall off from the suction cup, so that the reliability of rivet placement is low.

SUMMARY OF THE INVENTION

The embodiments of the present invention provide a robot vision-based automatic rivet placement system and method, which can solve the problems that rivets are hard to unpack and take out, the rivet placement efficiency is low, and more varieties of rivets cannot be conveyed.

In order to achieve the foregoing objectives, the embodiments of the present invention adopt the following technical solutions:

In a first aspect, the embodiments of the present invention provide a robot vision-based automatic rivet placement system, including: an industrial robot (1), a multi-functional end effector (2), a cover plate component (3), a rivet blowing mechanism (4), a detection disk (5), a vacuum generator (6), a valve group (7), a control cabinet (8), a frame (9), a rivet holding tray (10) and an industrial personal computer (11).

The industrial robot (1), the cover plate component (3), the rivet blowing mechanism (4), the detection disk (5), the vacuum generator (6), the valve group (7) and the rivet holding tray (10) are installed on the frame (9).

The multi-functional end effector (2) is composed of a flange disk (12), a support frame (13), an industrial CCD camera (14), a laser displacement sensor (15), a spring (16), a mixing rod (17) and a vacuum nozzle (18).

The multi-functional end effector (2) is connected to a terminal end of the industrial robot (1) via the flange disk (12).

The support frame (13) is used to fix elements on the multi-functional end effector (2).

The industrial CCD camera (14) and the laser displacement sensor (15) form a rivet space pose measurement module, wherein the industrial CCD camera (14) is installed directly in front of the support frame (13) and is used to acquire a rivet image.

The laser displacement sensor (15) is installed on a side surface of the support frame (13) and is used to measure a rivet depth.

The spring (16) and the mixing rod (17) form an elastic mixing mechanism and is used to mix the rivet holding tray (10).

The vacuum nozzle (18) is installed below the support frame (13) and is used to pick up or place a rivet.

In a second aspect, the embodiments of the present invention provide a robot vision-based automatic rivet placement method, including the following steps:

step a: sending, by an industrial personal computer (11), a control signal to an industrial robot (1), and controlling, by a robot controller in a control cabinet (8), the industrial robot (1) according to the control signal to move to a position directly above the rivet holding tray (10) corresponding to a model number of rivets to be picked up, wherein the model number of the rivets to be picked up is recorded in the control signal;

step b: measuring, by a multi-functional end effector (2), a position of a rivet in the rivet holding tray (10) through a secondary positioning measurement strategy, executing a pick-up action, and then placing the picked rivet into a detection disk (5);

step c: measuring, by the multi-functional end effector (2), a diameter, a length and a position posture of the rivet in the detection disk (5), and determining a defective product according to a measurement result; and step d: picking up, by the industrial robot (1), the rivet in the detection disk (5) and feeding the rivet into a rivet blowing mechanism (4); and blowing, by the rivet blowing mechanism (4), the received rivet to automatic drilling and riveting equipment.

In the present embodiment, a visually guided robot executes rivet pick-up and conveying operations to unpack and take out rivets in a holding tray, places the rivets on the detection disk for length and diameter measurement and defective product culling, and finally feeds the rivets into a rivet placement pipe in a specified posture to blow them to the automatic drilling and riveting equipment. The present invention further discloses a working method of a robot vision-based automatic rivet placement system. The present invention solves the problem about rivet placement of the automatic drilling and riveting equipment, and can convey rivets of 35 specifications to an automatic drilling and riveting terminal end, thereby ensuring efficient operations of the automatic drilling and riveting equipment.

BRIEF DESCRIPTION OF THE DRAWINGS

In order to more clearly illustrate the technical solutions of the embodiments of the present invention, the drawings used in the description of the embodiments are briefly described below, and it is obvious that the drawings in the description below are only some embodiments of the present invention, and a person of ordinary skill in the art can obtain other drawings from these drawings without any creative effort.

In the drawings, respective numerals respectively denote: 1: industrial robot; 2: multi-functional end effector; 3: cover plate component; 4: rivet blowing mechanism; 5: detection disk; 6: vacuum generator; 7: valve group; 8: control cabinet; 9: frame; 10: rivet holding tray; 11: industrial personal computer; 12: flange disk; 13: support frame; 14: industrial CCD camera; 15: laser displacement sensor; 16: spring; 17: mixing rod; 18: vacuum nozzle; 19: guide rail component; 20: first connecting piece; 21: rivet feeding tube; 22: cover plate; 23: pneumatic sliding table; 24: limiting block; 25: second connecting piece; 26: air pipe fast connector; 27: valve core; 28: valve body; 29: pipe clamp; 30: rivet; 31: sealing ring; 32: rivet placement pipe; 33: floating connector; 34: air cylinder; 35: air blowing nozzle; 36: air nozzle support frame; 37: acrylic plate; 38: table plate; 39: light source support frame; 40: backlight source; 41: hollow round disk; 42: baffle plate; 43: waste box.

DETAILED DESCRIPTION OF THE INVENTION

In order to make those skilled in the art better understand the technical solutions of the present invention, the present invention is further described in detail below with reference to the accompanying drawings and specific implementation manners. The implementation manners of the present invention will be described in detail below, and examples of the implementation manners are shown in the accompanying drawings, in which the same or similar reference numerals denote the same or similar elements or elements with the same or similar functions. The implementation manners described below with reference to the accompanying drawings are exemplary, and are only used to explain the present invention, and cannot be construed as limiting the present invention. Those skilled in the art can understand that, unless specifically stated, the singular forms "a", "an", " " and "the" used herein may also include plural forms. It should be further understood that the wording "include" used in the description of the present invention refers to the presence of the features, integers, steps, operations, elements and/or components, but does not exclude the presence or addition of one or more other features, integers, steps, operations, elements, components and/or their combinations. It should be understood that when it is referred to as being "connected" or "coupled" to another element, an element can be directly connected or coupled to other elements or intermediate elements may also exist. In addition, for the presence of components such as communication electronics, the "connected" or "coupled" used herein may include wireless connection or coupling. As used herein, the wording "and/or" includes any unit and all combinations of one or more of the associated listed items.

Those skilled in the art can understand that, all terms (including technical and scientific terms) used herein have the same meaning as commonly understood by those of ordinary skill in the art to which the present invention belongs, unless otherwise defined. It should also be understood that terms, such as those defined in general-purpose dictionaries, should be interpreted as having a meaning that is consistent with their meaning in the context of the prior art, and will not be interpreted in an idealized or overly formal sense unless defined as herein.

Figure 1:
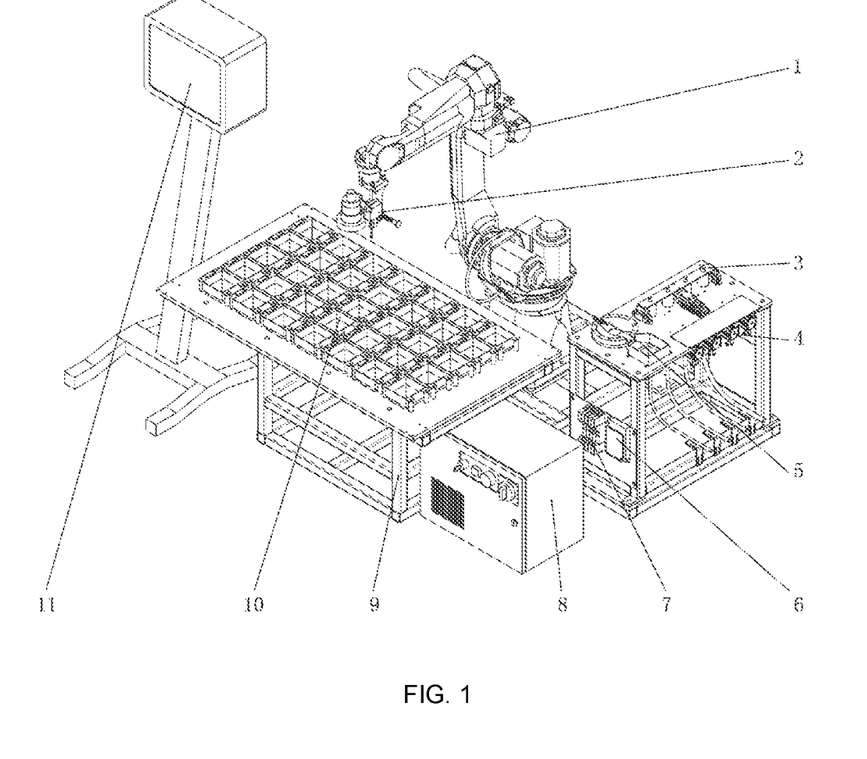
FIG. 1 is an axonometric drawing of a robot vision measurement and control-based automatic rivet placement system according to the present invention.

The embodiments of the present invention provide a robot vision-based automatic rivet placement system, as shown in FIG. 1, including:

an industrial robot (1), a multi-functional end effector (2), a cover plate component (3), a rivet blowing mechanism (4), a detection disk (5), a vacuum generator (6), a valve group (7), a control cabinet (8), a frame (9), a rivet holding tray (10) and an industrial personal computer (11).

The industrial robot (1), the cover plate component (3), the rivet blowing mechanism (4), the detection disk (5), the vacuum generator (6), the valve group (7) and the rivet holding tray (10) are installed on the frame (9).

Figure 2:
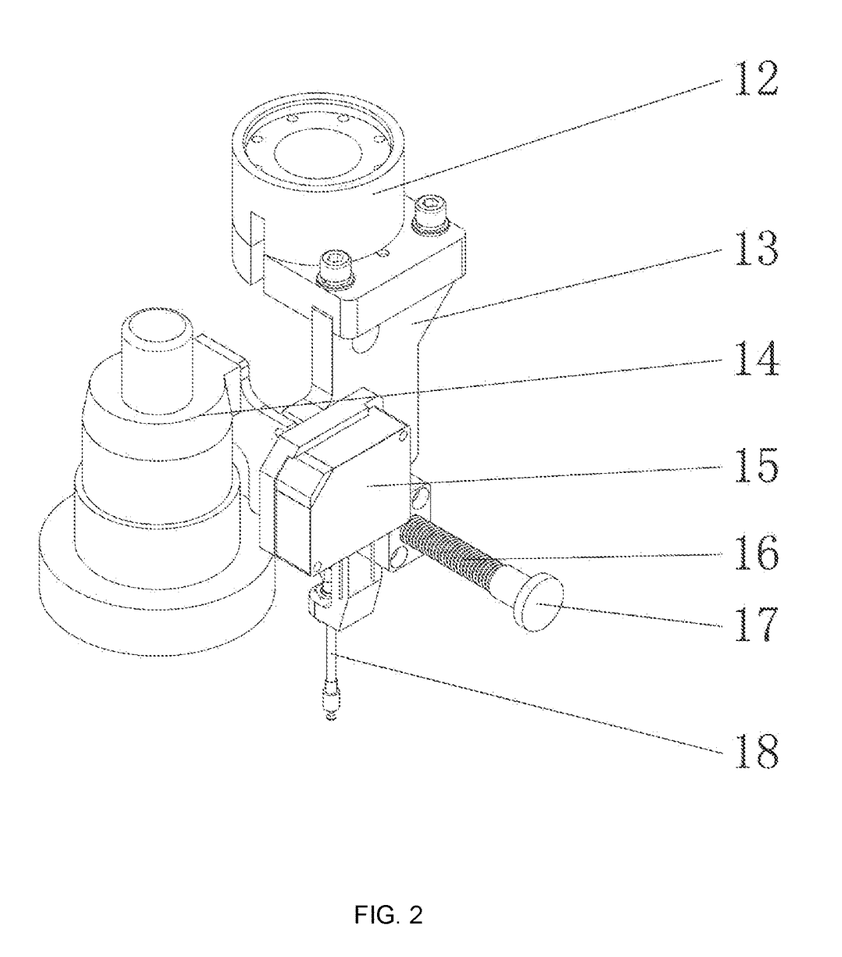
FIG. 2 is an axonometric drawing of a multi-functional end effector according to the present invention.

As shown in FIG. 2, the multi-functional end effector (2) is composed of a flange disk (12), a support frame (13), an industrial charge coupled device (CCD) camera (14), a laser displacement sensor (15), a spring (16), a mixing rod (17) and a vacuum nozzle (18). The multi-functional end effector (2) is connected to a terminal end of the industrial robot (1) via the flange disk (12). The support frame (13) is used to fix elements on the multi-functional end effector (2).

The industrial CCD camera (14) and the laser displacement sensor (15) form a rivet space pose measurement module. The industrial CCD camera (14) is installed directly in front of the support frame (13) and is used to acquire a rivet image. The rivet image is used to measure a planimetric position of a rivet. The laser displacement sensor (15) is installed on a side surface of the support frame (13) and is used to measure a rivet depth. The spring (16) and the mixing rod (17) form an elastic mixing mechanism used to mix the rivet holding tray (10) to uniformly distribute the rivets. The vacuum nozzle (18) is installed below the support frame (13) and is used to pick up or place a rivet. The elastic mixing mechanism on the multi-functional end effector can mix the rivet holding tray to uniformly distribute the rivets, which is helpful for a robot to fast identify the rivets.

In the preferred solution of the present embodiment, 35 rivet holding trays (10) are provided in total, and are arranged in five rows and seven columns, so as to meet a rivet placement requirement of most standard rivets in current aircraft manufacturing. More kinds of rivet models are built in a vision processing program of the industrial personal computer, so that the robot can identify, pick up and convey more types of rivets. The flexibility of the rivet placement system is significantly improved.

Current automatic drilling and riveting equipment needs to be subjected to further optimization and upgrading and secondary development to really meet actual production requirements. For example: in the invention with the publication patent number CN101733355, a vibrating plate is used to directionally arrange the rivets to specified positions, and then the rivet blowing mechanism moves to the front of the arranged rivets to blow the rivets to a drilling and riveting terminal end. However, the vibrating plate severely affects the hole making accuracy due to its large volume and high vibration noise, and one vibrating plate can only arrange 1 to 3 kinds of rivets. This solution cannot meet the requirements for an automatic aircraft drilling and riveting operation in which dozens of rivets need to be conveyed in one technological process. For another example: in the invention with the publication patent number CN109290506, a binocular vision pick-up terminal end is used to identify and pick up various types of rivets. However, the binocular vision can only identify rivets in a single-layer sparse distribution state, which cannot adapt to a situation where rivets are crossed and stacked layer by layer, and the identification rate of rivets is low. Moreover, an air claw is used to pick up the rivets, leading to the disadvantages that pick-up is unreliable, excessive rivets are easy to pick up, and there are rivets which are not picked up. Especially when a plurality of rivets are crossed or touch at the edges, parameters, such as the diameter and the length, of the rivets cannot be measured. Furthermore, in actual application of this solution, the rivets in a holding rack need to be conveyed to a pick-up station before visual inspection and pick-up are performed, so that the overall working efficiency is low.

In the present embodiment, a visually guided robot can directly unpack and take out rivets in a rivet holding box, so that the step of directionally arranging the rivets is eliminated; therefore, the efficiency and the speed are high. The vacuum nozzle is used to pick up the rivets. The nozzle can be accurately positioned on the surface of the rivet, and a soft silica gel suction cup forms wrappage on a rivet cylinder, so that the rivet is grasped more firmly, and the problems that excessive rivets are easy to pick up, the rivets are easy to fall off, and the like when a traditional air claw is used to pick up the rivets are solved. Furthermore, a negative pressure feedback mechanism of the vacuum generator can monitor in real time whether the rivets are picked up successfully. If the rivets fall off in the pick-up and carrying process, the robot automatically re-executes an action of picking up the rivets to ensure that the robot can pick up the rivets. The laser displacement sensor cooperates with the industrial CCD camera to measure a spatial position of a rivet, so that the problem that a monocular camera cannot measure a distance of the rivet in a depth direction is solved; the measurement accuracy in the depth direction is high, and the accuracy of the position for rivet pick-up is guaranteed.

Figure 3:
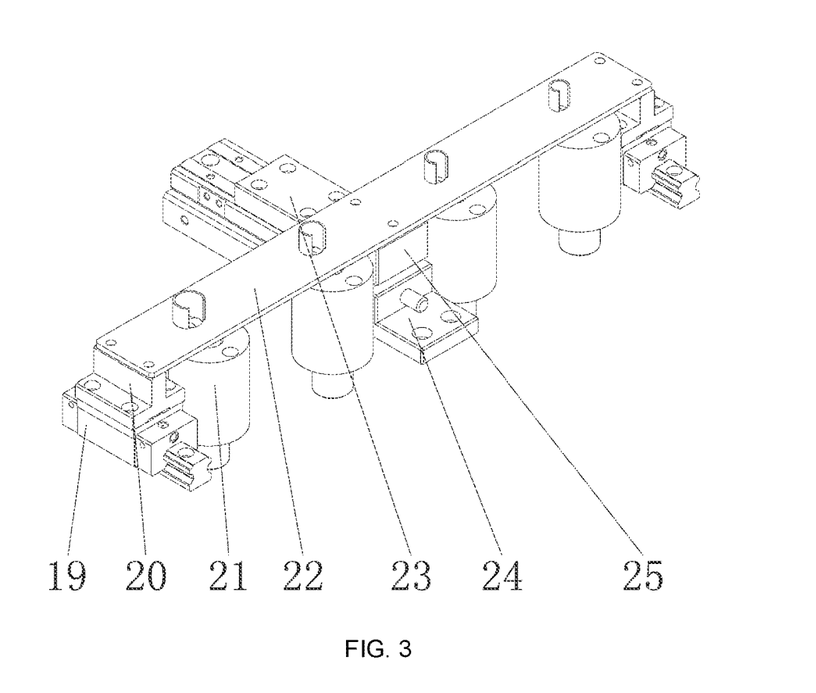
FIG. 3 is a schematic diagram of a closed state of a cover plate component according to the present invention.

As shown in FIG. 3, the cover plate component (3) is composed of a guide rail component (19), a first connecting piece (20), a rivet feeding tube (21), a cover plate (22), a pneumatic sliding table (23), a limiting block (24) and a second connecting piece (25). The first connecting piece (20) is used to connect the guide rail component (19) and the cover plate (22); the second connecting piece (25) is used to connect the pneumatic sliding table (23) and the cover plate (22); and the limiting block (24) is used to limit the position of the cover plate (22).

Figure 4:
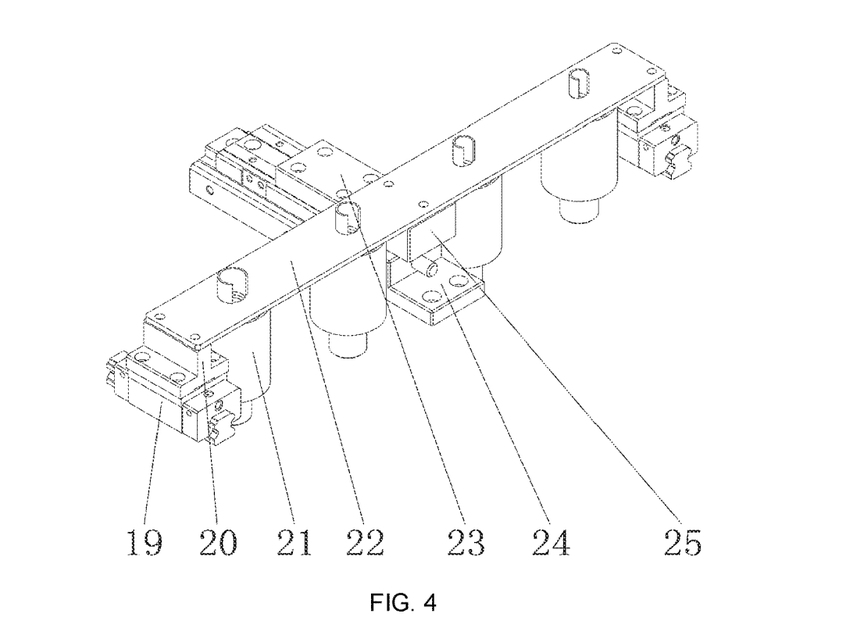
FIG. 4 is a schematic diagram of an open state of a cover plate component according to the present invention.

As shown in FIG. 3 and FIG. 4, the rivet feeding tube (21) is located directly below the cover plate (22). When the pneumatic sliding table (23) pushes out the cover plate (22), an inner hole of the rivet feeding tube (21) is aligned with a rivet inlet hole of the cover plate (22); and at this time, the robot can put a rivet into the rivet feeding tube. When the pneumatic sliding table (23) withdraws the cover plate (22), the inner hole of the rivet feeding tube (21) is sealed by the cover plate (22), and the rivet and other debris cannot enter the rivet feeding tube.

Specifically, as shown in FIG. 4, the cover plate (22) is provided with four holes having different diameters. Edges of the four holes are respectively welded with arc-shaped opening retainer rings to prevent the rivet from popping out during placement.

Figure 5:
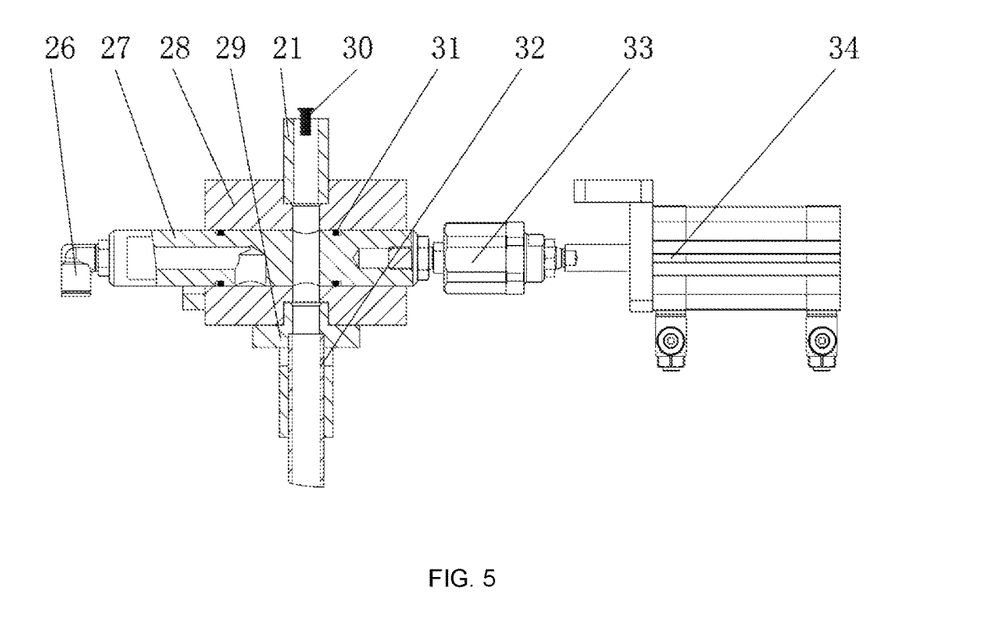
FIG. 5 is a schematic diagram of an open state of a rivet blowing mechanism according to the present invention.

As shown in FIG. 5, the rivet blowing mechanism (4) is composed of an air pipe fast connector (26), a valve core (27), a valve body (28), a pipe clamp (29), sealing rings (31), a rivet placement pipe (32), a floating connector (33), and an air cylinder (34). The valve core (27), the sealing rings (31) and the valve body (28) form a valve of the rivet blowing mechanism (4).

The air pipe fast connector (26) is connected to a left end of the valve core (27). The floating connector (33) connects a right end of the valve core (27) and a piston rod of the air cylinder (34). The pipe clamp (29) connects the valve body (28) and the rivet placement pipe (32). The rivet feeding tube (21) is installed at an upper end of the valve body (28). Two sealing rings (31) are respectively sleeved in two grooves of the valve core (27).

Figure 6:
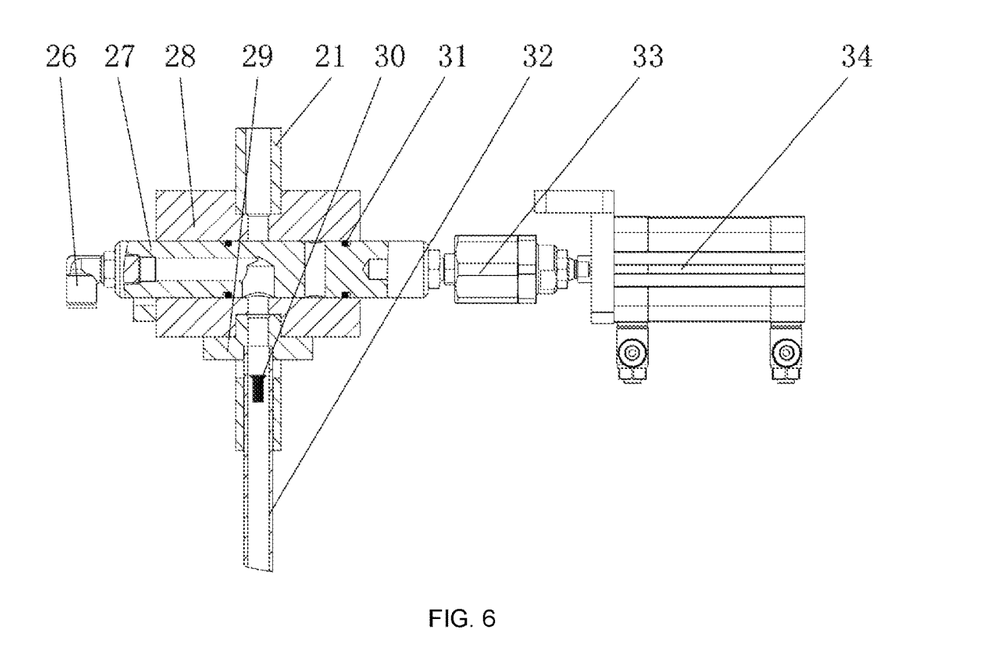
FIG. 6 is a schematic diagram of a closed state of a rivet blowing mechanism according to the present invention.

As shown in FIG. 6, the valve core (27) is of an elongate cylindrical structure; the valve core (27) is provided with an air path channel and a rivet channel; and the air path channel is connected to the air pipe fast connector (26).

Figure 7:
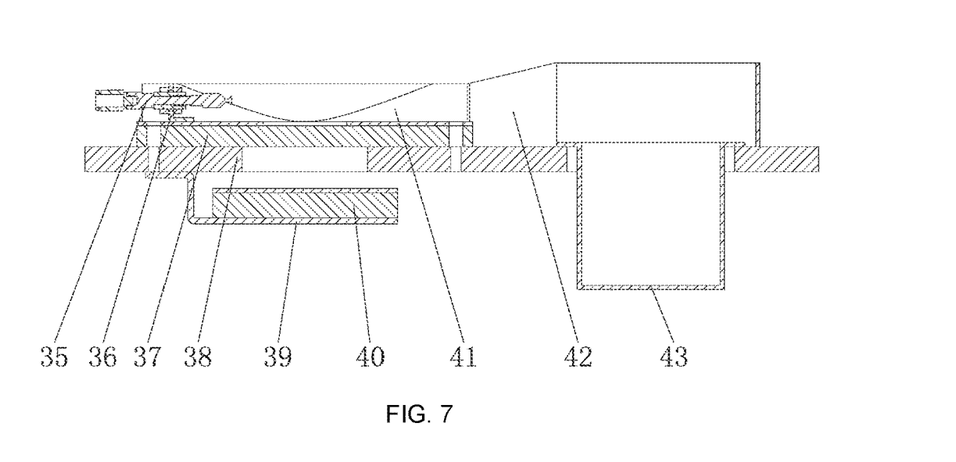
FIG. 7 is a sectional view of a detection disk according to the present invention.
Figure 8:
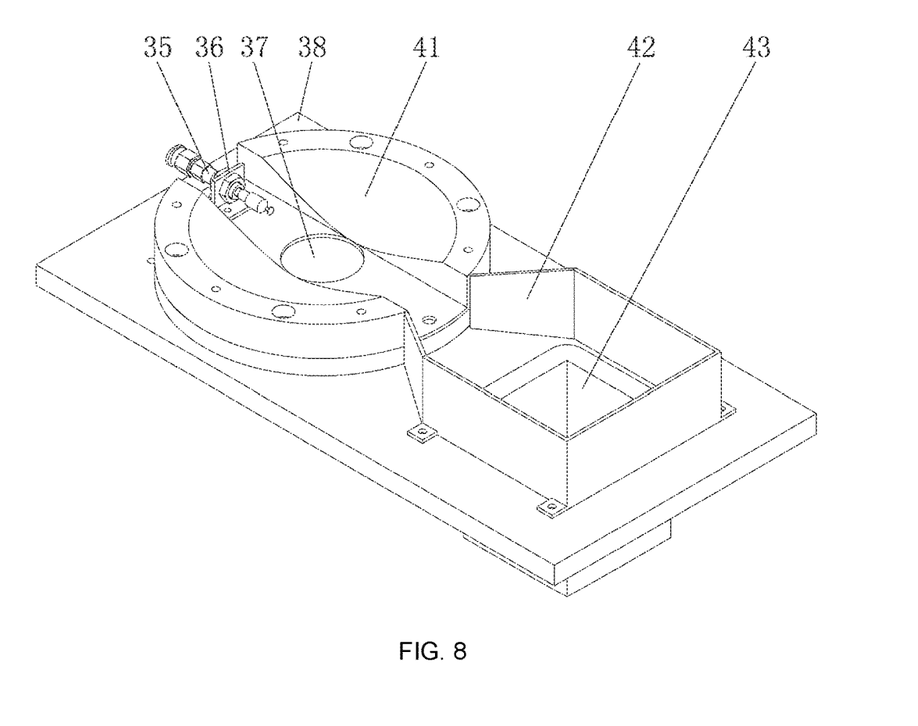
FIG. 8 is an axonometric drawing of a detection disk according to the present invention.

As shown in FIG. 7 and FIG. 8, the detection disk (5) is composed of an air blowing nozzle (35), an air nozzle support frame (36), an acrylic plate (37), a light source support frame (39), a backlight source (40), a hollow round disk (41), a baffle plate (42) and a waste box (43). The transparent disk-shaped acrylic plate (37) and the hollow round disk (41) are fixed above a table plate (38) and directly opposite to the backlight source (40); and the baffle plate (42) and the waste box (43) are placed on a right side of the hollow round disk (41).

The air nozzle support frame (36) is used to fix the air blowing nozzle (35) on the hollow round disk (41), and the light source support frame (39) is used to fix the backlight source (40) below the table plate (38).

The embodiments of the present invention provide a robot vision-based automatic rivet placement method. The automatic rivet placement method is applied to the robot vision-based automatic rivet placement system in the present embodiment. The automatic rivet placement system is composed of an industrial robot (1), a multifunctional end effector (2), a cover plate component (3), a rivet blowing mechanism (4), a detection disk (5), a vacuum generator (6), a valve group (7), a control cabinet (8), a frame (9), a rivet holding tray (10) and an industrial personal computer (11).

The method includes the following steps:
- step a: sending, by the industrial personal computer (11), a control signal to the industrial robot (1), and controlling, by a robot controller in the control cabinet (8), the industrial robot (1) according to the control signal to move to a position directly above the rivet holding tray (10) corresponding to a model number of rivets to be picked up, wherein the model number of the rivets to be picked up is recorded in the control signal;
- step b: measuring, by the multi-functional end effector (2), a position of a rivet in the rivet holding tray (10) through a secondary positioning measurement strategy, executing a pick-up action, and then placing the picked rivet into the detection disk (5);
- step c: measuring, by the multi-functional end effector (2), a diameter, a length and a position posture of the rivet in the detection disk (5), and determines a defective product according to a measurement result; and
- step d: picking up, by the industrial robot (1), the rivet in the detection disk (5) and feeding the rivet into the rivet blowing mechanism (4); and blowing, by the rivet blowing mechanism (4), the received rivet to automatic drilling and riveting equipment to complete one working cycle.

In the present embodiment, the secondary positioning measurement strategy used in the step b specifically includes the following sub-steps:
- transmitting a photographed rivet image to the industrial personal computer (11) through an industrial CCD camera (14);
- pre-processing, by a vision processing program in the industrial personal computer (11), the rivet image to obtain an estimated value of a position of the rivet in a horizontal direction, and sending, by the industrial personal computer (11), the estimated value to the industrial robot (1);
- adjusting, by the industrial robot (1), the pose according to the estimated value to enable the industrial CCD camera (14) to move to a position above the photographed rivet, and taking a picture again to obtain an accurate value of the position of the rivet in the horizontal direction;
- adjusting, by the industrial robot (1), the pose according to the accurate value such that a laser beam of a laser displacement sensor (15) is projected on the photographed rivet to obtain a position of the photographed rivet in a depth direction, and then feeding back the position in the depth direction to the industrial personal computer (11); and sending, by the industrial personal computer (11), the position in the depth direction to the industrial robot (1);
- adjusting, by the industrial robot (1), the pose according to the position in the depth direction, such that a vacuum nozzle (18) moves to a surface of the photographed rivet, and then turning on the vacuum generator (6); and
- sucking, by a suction cup of the vacuum nozzle (18), the photographed rivet, taking out, by the industrial robot (1), the photographed rivet from the rivet holding tray (10) and placing the photographed rivet in the detection disk (5).

The step b is re-executed till suction is successful when a negative pressure feedback sensor of the vacuum generator (6) monitors a suction failure.

The secondary positioning measurement strategy used solves the problem that the monocular camera cannot measure positions of rivets on different depth planes, such that even if rivets are on different depth planes, the positions of the rivets can also be accurately measured.

Specifically, the step c includes the following sub-steps:
- taking, by an industrial CCD camera (14), a picture and transmits the rivet image to the industrial personal computer (11), after a backlight source (40) is turned on;
- pre-processing, by a vision processing program in the industrial personal computer (11), the rivet image, and measures the diameter, the length and the direction of the rivet in the rivet image by means of a template matching technology; and
- if the rivet in the rivet image does not conform to a model number recorded in the control signal, and/or the rivet in the rivet image is defective, triggering an air blowing nozzle (35) to blow air to blow the defective rivet into a waste box (43).

Specifically, the step d includes the following sub-steps:
- pushing out a cover plate (22) to open a rivet inlet and turn on a valve, after the industrial robot (1) picks up the rivet in the detection disk (5), as shown in FIG. 4;
- opening the valve, and feeding, by the industrial robot (1), the rivet (30) into the rivet blowing mechanism (4), with a posture of rivet head upward, as shown in FIG. 5; and then retracting the cover plate (22) to seal the rivet inlet and close the valve, as shown in FIG. 3; and
- closing the valve, and introducing high-pressure air into an air path channel of a valve core (27) to blow the rivet (30) to the automatic drilling and riveting equipment, as shown in FIG. 6.

Further, the method also includes the following steps: projecting, by the industrial robot (1), laser to four corners of the rivet holding tray (10) through a laser displacement sensor (15) to obtain an average value of a rivet depth in the rivet holding tray (10); acquiring a residual number of rivets in the rivet holding tray (10) according to the average value of the rivet depth; and if the residual number is less than a preset value, sending, by the industrial personal computer (11), a replenishment prompt signal.

The laser displacement sensor (15) in the present embodiment may also be used to measure the residual number of rivets in the rivet holding tray (10), and the industrial robot (1) is controlled to project the laser to the four corners of the rivet holding tray (10) to calculate the average value of the rivet depth and measure the residual number of the rivets. When the residual number of the rivets are insufficient, the industrial personal computer (11) would prompt a worker to replenish rivets in time. The residual number of the rivets is monitored in real time through the laser displacement sensor, realizing intelligent management of the automatic rivet placement system.

The various embodiments in the present description are described in a progressive manner, and the same or similar parts between the various embodiments can be referred to each other, and each embodiment focuses on the differences from other embodiments. In particular, as for the device embodiment, since it is basically similar to the method embodiment, it is described relatively simply, and the relevant parts may refer to part of the illustration of the method embodiment. The above is only the specific implementation manner of the present invention, but the scope of protection of the present invention is not limited thereto. Any person skilled in the art can easily think of changes or replacements within the technical scope disclosed by the present invention, which should be covered by the scope of protection of the present invention. Therefore, the scope of protection of the present invention shall be subject to the scope of protection of the claims.

The invention claimed is:

1. A robot vision-based automatic rivet placement system, comprising: an industrial robot (1), a multi-functional end effector (2), a cover plate component (3), a rivet blowing mechanism (4), a detection disk (5), a vacuum generator (6), a valve group (7), a control cabinet (8), a frame (9), a rivet holding tray (10) and an industrial personal computer (11), wherein the industrial robot (1), the cover plate component (3), the rivet blowing mechanism (4), the detection disk (5), the vacuum generator (6), the valve group (7) and the rivet holding tray (10) are installed on the frame (9);

the multi-functional end effector (2) is composed of a flange disk (12), a support frame (13), an industrial CCD camera (14), a laser displacement sensor (15), a spring (16), a mixing rod (17) and a vacuum nozzle (18);

the multi-functional end effector (2) is connected to a terminal end of the industrial robot (1) via the flange disk (12);

the support frame (13) is used to fix elements on the multi-functional end effector (2);

the industrial CCD camera (14) and the laser displacement sensor (15) form a rivet space pose measurement module, wherein the industrial CCD camera (14) is installed directly in front of the support frame (13) and is used to acquire a rivet image;

the laser displacement sensor (15) is installed on a side surface of the support frame (13) and is used to measure a rivet depth;

the spring (16) and the mixing rod (17) form an elastic mixing mechanism and is used to mix the rivet holding tray (10); and the vacuum nozzle (18) is installed below the support frame (13) and is used to pick up or place a rivet.

2. The robot vision-based automatic rivet placement system according to claim 1, wherein the cover plate component (3) is composed of a guide rail component (19), a first connecting piece (20), a rivet feeding tube (21), a cover plate (22), a pneumatic sliding table (23), a limiting block (24) and a second connecting piece (25);

the first connecting piece (20) is used to connect the guide rail component (19) and the cover plate (22); the second connecting piece (25) is used to connect the pneumatic sliding table (23) and the cover plate (22); and the limiting block (24) is used to limit a position of the cover plate (22).

3. The robot vision-based automatic rivet placement system according to claim 2, wherein the rivet feeding tube (21) is located directly below the cover plate (22); and when the pneumatic sliding table (23) pushes out the cover plate (22), an inner hole of the rivet feeding tube (21) is aligned with a rivet inlet hole of the cover plate (22);

and when the pneumatic sliding table (23) withdraws the cover plate (22), the inner hole of the rivet feeding tube (21) is sealed by the cover plate (22).

4. The robot vision-based automatic rivet placement system according to claim 3, wherein the cover plate (22) is provided with four holes having different diameters; and edges of the four holes are respectively welded with arc-shaped opening retainer rings.

5. The robot vision-based automatic rivet placement system according to claim 2, wherein the rivet blowing mechanism (4) is composed of an air pipe fast connector (26), a valve core (27), a valve body (28), a pipe clamp (29), sealing rings (31), a rivet placement pipe (32), a floating connector (33), and an air cylinder (34), wherein the valve core (27), the sealing rings (31) and the valve body (28) form a valve of the rivet blowing mechanism (4).

6. The robot vision-based automatic rivet placement system according to claim 5, wherein the air pipe fast connector (26) is connected to a left end of the valve core (27);

the floating connector (33) connects a right end of the valve core (27) and a piston rod of the air cylinder (34);

the pipe clamp (29) connects the valve body (28) and the rivet placement pipe (32);

the rivet feeding tube (21) is installed at an upper end of the valve body (28); and two sealing rings (31) are respectively sleeved in two grooves of the valve core (27).

7. The robot vision-based automatic rivet placement system according to claim 6, wherein the valve core (27) is of an elongate cylindrical structure; the valve core (27) is provided with an air path channel and a rivet channel; and the air path channel is connected to the air pipe fast connector (26).

8. The robot vision-based automatic rivet placement system according to claim 2, wherein the detection disk (5) is composed of an air blowing nozzle (35), an air nozzle support frame (36), an acrylic plate (37), a light source support frame (39), a backlight source (40), a hollow round disk (41), a baffle plate (42) and a waste box (43);

the acrylic plate (37) and the hollow round disk (41) are fixed above a table plate (38) and directly opposite to the backlight source (40); and the baffle plate (42) and the waste box (43) are placed on a right side of the hollow round disk (41);

the air nozzle support frame (36) is used to fix the air blowing nozzle (35) on the hollow round disk (41), and the light source support frame (39) is used to fix the backlight source (40) below the table plate (38).

9. The robot vision-based automatic rivet placement system according to claim 1, wherein the detection disk (5) is composed of an air blowing nozzle (35), an air nozzle support frame (36), an acrylic plate (37), a light source support frame (39), a backlight source (40), a hollow round disk (41), a baffle plate (42) and a waste box (43);

the acrylic plate (37) and the hollow round disk (41) are fixed above a table plate (38) and directly opposite to the backlight source (40); and the baffle plate (42) and the waste box (43) are placed on a right side of the hollow round disk (41);

the air nozzle support frame (36) is used to fix the air blowing nozzle (35) on the hollow round disk (41), and the light source support frame (39) is used to fix the backlight source (40) below the table plate (38).

10. The robot vision-based automatic rivet placement system according to claim 1, wherein 35 rivet holding trays (10) are provided in total, and are arranged in five rows and seven columns.

* * * * *